3,325,275
PROCESS FOR PRODUCING NITROGEN-RICH ORGANIC MATERIALS ESPECIALLY FOR USE AS FERTILIZERS

Karl Bratzler and Hugo Schafer, Bad Homburg vor der Hohe, Germany, and Georg Friedrich Wilhelm Hingst, deceased, late of Bad Segeberg, Germany, by Elisabeth Friederike Hildegard Hingst, Bad Segeberg, Germany, heir and legal guardian of minor heirs, Margrit Hingst, Luneburg, Germany, and Klaus Peter Hingst, Kiel, Germany, heirs, and Per Aalrust, Darmstadt, Germany, assignors to Metallgesellschaft Aktiengesellschaft, Frankfurt am Main, Germany
No Drawing. Filed June 25, 1963, Ser. No. 290,861
9 Claims. (Cl. 71—25)

This invention relates to a process for producing nitrogen-rich organic materials, particularly useful as fertilizers, the process being based on the reaction between substances containing humic acid and/or lignin with ammonia and oxygen under specified operating conditions.

Nitrogen-rich fertilizers have been prepared by treating fossil or fresh plant materials in an autoclave with oxygen and ammonia simultaneously at 200–250° C. The same raw materials have also been treated with ammonia under oxidizing conditions at 50–250° C. under ordinary pressure. As oxidizing agents, air or other oxygen containing or oxidizing gases have been used. The process was first performed under a pressure of about 50 atms.

The process was then improved by keeping the temperatures below 200° C., preferably between 80 and 150° C., while working with moist materials. The oxygen could be at pressures of less than 10 atms.

Application of heat from the outside was necessary only to initiate the reaction. After the reaction was in progress, the heat that was liberated thereby was sufficient to keep the reaction going, the reaction temperature being regulated by changing the amount or composition of the air or the thickness of the layer of material. The concentration of ammonia in the ammonia-air mixture which is to be passed over the raw material is regulated in such a manner that the gas which leaves the reaction chamber will be as free as possible from ammonia. The process can be carried out with or without catalysts such as inorganic compounds of alkalies, alkaline earths, or heavy metals, such as oxides, hydroxides or salts, e.g. carbonates.

As raw materials, use was made of humic acids or materials of vegetable origin containing humic acid such as peat, brown coal, bituminous coal, decayed wood, etc., or substances that are capable of forming humic acids such as lignin, lignin sulfonic acids, lignin residues, cellulose containing substances, or carbohydrates of vegetable origin. The product contained 10–20% nitrogen of which the greater portion, or about 60–90% was in the ionic form, while the remainder was mainly in molecular form as organic molecules. The raw materials are introduced in the solid state, either dry or moist.

The process can be performed in two stages, moist materials being used in the first stage and dry materials in the second stage. The product was of increased apparent specific gravity. The same advantageous result can also be produced by heating the moist raw material under pressure.

The heat that is liberated by the reaction can be used for drying the raw material and for maintaining the required working temperature.

Such processes are described in German Patents 507,320, 527,313, 545,923, 545,924, 559,254, 508,258, 514,510, 561,316, 857,200, 870,565, 883,609, 1,061,803 and 1,091,122; in the Austrian Patents 177,429, 123,812, 213,116 and 177,430, in United States Patent 2,027,766, as well as in the Swiss Patents 189,149 and 148,776.

According to German Patents 897,573 and 597,035, the process can also be performed continuously under normal pressure.

Although all of these processes are theoretically feasible, serious problems were encountered which made the processes unattractive from both the technological and economic standponits. For example, the preparation of the solid raw materials, either in the dry or in the wet condition, required a cumbersome and expensive apparatus. Extensive corrosion often occurred. The apparatus furthermore did not perform satisfactorily. It often failed to produce a product of uniform character with the nitrogen in the desired chemical combination. It was also difficult with such an apparatus to always establish the desired ratio of ionically bound nitrogen to organic molecular nitrogen, and to maintain a high total nitrogen content in the product. These processes have therefore not been generally adopted.

Sulfite liquors obtained by boiling with calcium sulfite or ammonia containing liquors have been likewise converted into fertilizers by oxidizing treatment with ammonia. Temperatures below 200° C., e.g. between 120 and 160° C. were used with reaction times of 2 to 4 hours or more. If this treatment occurred after concentration of the sulfite liquor, or if solids precipitated from the liquor were treated, the above-mentioned difficulties would again be encountered (Austrian Patent 177,429). If lyes in their liquid state or after fermentation, e.g. to alcohol, are used as the starting material, the nitrogen content of the fertilizer obtained therefrom will be relatively low and will not always be in the desired chemical combinations. (DRP 561,487 and 525,068.)

The principal object of the present invention therefore is to provide an improved process for the production of nitrogen-rich organic materials from raw materials containing humic acid and/or lignin.

Unlike these frequently suggested but technically and economically unsatisfactory methods of producing lignin products with high nitrogen contents, the process of the present invention has made it possible to produce fertilizers with considerably more than 10%, and even in excess of 20% of combined nitrogen. Specifically humic acids or materials of vegetable origin containing humic acid, such as peat, brown coal, bituminous coal, decayed wood, etc., or from lignin or lignin containing materials such as lignin sulfonic acids, lignin residues, cellulose containing substances or carbohydrates containing residues, especially lixiviates from the cellulose industry or from wood hydrolysis, are reacted at temperatures between 50 and 130° C. and under pressures between 10 and 150 atmospheres, gage, with an addition of an amount of ammonia equal to at least 15% by weight, preferably about 20% to 200% of the starting material, the ammonia preferably being in about a 10–25% by weight in solution.

The amount of nitrogen that is combined with or taken up by the lignin containing materials is in a definite and nearly linear relation to the amount of oxygen that is introduced and used in the reaction. For every mol of oxygen that is taken up, about 0.67 mol ammonia will be bound, or about 1.5 mol oxygen for every 1 mol ammonia. These proportions remain valid from about 150 N liters consumed oxygen per kg. dried lixivium for binding about 14% nitrogen in the reaction product, to about 300 Nl. oxygen for binding about 20% nitrogen in the reaction product. When the amount of used oxygen is less than about 150 Nl. per kg. dry substance, the nitrogen will be taken up more rapidly than when the preceding relationship would indicate; whereas above about 300 Nl. oxygen a slight leveling off occurs in the amount of nitrogen that is bound, so that with an oxygen addition of about 400 Nl. per kg. dry substance the amount of bound nitrogen goes up to only about 22–23%. It is, therefore, highly advantageous that the molar ratio of ammonia to oxygen be about 3:5, and that the content of oxygen be at least 300 Nl. per kg. of dry starting material.

The amount of nitrogen which is thus introduced into lignin products by the method of this invention is therefore greater than was thought possible in the prior art, especially since in organic chemistry, complex compounds with such large amounts of nitrogen occur only rarely.

Under the conditions of this invention the reaction which commences above 50° C. becomes more rapid between 90° and 100° C. The additional generation of heat which results therefrom can be compensated by a regulation of the externally applied heat. A decrease in the rate of oxygen absorption can be compensated by raising the temperature to about between 110° and 130° C. The reaction can be easily controlled by regulation of the amount of added or used oxygen which in turn controls the amount of nitrogen that is bound by the lignin material.

The oxygen or the molecular oxygen containing gas, e.g. air, is introduced under pressures of 100 atmospheres gage or more, or under lower pressures down to below 30 atmospheres gage, into an autoclave provided with a stirrer. The reaction up to a nitrogen absorption of 20–22% will take about 5 to 6 hours. The pressure or partial pressure of the oxygen can vary within wide limits. If the pressure is diminished, the reaction will proceed more slowly. By the use of apparatus with automatically controlled gas pressure, the oxidation can be performed with the oxygen kept at constant pressure. The preferred reaction pressure is in the range of 10 to 130 atmospheres.

Even if the reaction requires a larger amount of ammonia, its concentration in the reaction solution has hardly any effect on the course of the reaction. The process can be conducted in such a manner that before the reaction commences, the ammonia is all added as an aqueous solution or is conducted in a gaseous state into an aqueous solution or suspension of the lignin material. While the reaction is in progress the ammonia can be added either as an aqueous solution or as a gas. The ammonia will have to be added in somewhat larger amount than what would later correspond to the bound nitrogen in the end product. During the reaction carbonic acid is produced in small amounts as a by-product, and the ammonia must be sufficiently in excess to form ammonium bicarbonate therefrom. If the pH of the solution comes down to 7 or less, there will be no further reaction. Consequently the pH should be at least 7.5, preferably in the range of 7.5 to 12 during the reaction. For the principal reaction here described, it is also advantageous to keep the tempearture below 120° C. and not to let it get higher than 130° C. or certain deleterious side reactions may occur, the preferred temperature range being 50 to 130° C.

For carrying out this reaction, use it advantageously made of the substances contained in the sulfite liquors of the cellulose industry which contain large amounts of lignin materials. The kind of digestion, whether e.g. with ammonium bisulfite or with calcium bisulfite, or the kind of wood, whether spruce or beech, is of little if any consequence as far as the progress of the reaction and the amount of combined nitrogen in relation to the amount of absorbed oxygen is concerned. In all cases the same degree of success will be achieved with remarkably little variation if the amount of organic material in the lixivium remains the same. It is also of only secondary importance whether or not the lixivium has been further concentrated or has fermented or moulded; however, it is preferred that the liquor be concentrated to about 3–4 times the original. A suspension of a previously precipitated basic calcium lignin sulfonate is equally suitable as a starting material.

It was surprising that alkali lignin which was precipitated from the black sulfite liquor by carbonic acid can also be reacted in this manner, and that it is possible to combine nitrogen with this lignin substance in practically the same manner, except that in the end product the bound nitrogen will be diminished by the amount that could be bound by the sulfo groups of the lignin sulfonates.

For the purpose of this invention the term lignin therefore covers all lignin by-products produced in the pulp and paper industry.

In order to ensure a uniform rate of reaction during all reaction stages, it is necessary with certain lignin preparations to add besides the ammonia, also a slight amount, e.g. 1 to 6% by weight of the total mass, alkali hydroxide, and since the material is eventually to be used as a fertilizer, it is preferable to use KOH.

It is very advantageous for the reaction to thoroughly mix the gas and the reaction solution. If use is made of suitable technical expedients, e.g. by simultaneously pumping the gas and the liquid to keep them in circulation or thoroughly mixed, it will be possible to reduce the reaction time appreciably, e.g. to one hour, and at the same time also reduce the oxygen pressure to about 10 to 30 atms. gage.

After the reaction has terminated or has been stopped at some desired time, the final products with high nitrogen content are obtained by evaporation and drying of the reaction products. In order to preserve the water solubility of the materials, they should be dried as cautiously as possible. For example the materials are dried at temperatures between 60 and 110° C. and the drying may be done in a spray dryer or a vacuum dryer or in any other convienient drying apparatus.

The products thus obtained are completely soluble in water. The nitrogen content is in different forms, e.g. by boiling with magnesium oxide, of about 20–40% of the nitrogen is obtained in the ionic form, and by boiling the residue with NaOH an additional 10–30% can be obtained, which was probably amide-nitrogen. The remaining 40–50% is in a more stable organic form.

Experiments have shown that the lignin molecule, although generally very stable, is completely susceptible to this reaction, and is actually more susceptible than the products of subsequent reaction stages. If such products are subjected to dialysis to separate the small molecules from the large ones, it will be found that the smaller molecules have a higher combined nitrogen content than the larger molecules. That the latter have, however, taken up the nitrogen and the oxygen in the same relative amounts as the smaller molecules, although not in the same total proportion, is proved by the fact that lignins of higher molecular weight are equally susceptible to the reaction. If the heavier molecules are reacted again in the same manner, they will take on additional nitrogen in the same ratio to the added oxygen. If the resulting products are subjected to another dialysis, it will be found that most of the material is now dialyzable, having become of lower molecular weight. The process is therefore also suitable for causing slow depolymerization of the lignin substance. The procedural precautions which should be used for this purpose are those which will cause the reaction to proceed as uniformly as possible, e.g. low concentration of the solids to be decomposed, maintenance of as low a temperature as possible, low oxygen pressure, and above all thorough mixing of the gas with the reaction solution. Since the low molecular weight components obtained by this process are those with the higher nitrogen contents, all the usual precautions for ensuring the smoothest possible reaction would also be applicable wherever nitrogen is to be bound to lignin products.

Instead of resorting to dialysis, the low and high molecular weight lignin components can also be separated, although possibly with less selectivity, by the addition of organic solvents, e.g. methanol (preferably 80%).

This invention is also adapted to split off most of the methoxy groups from the lignin material. This is preferably done with a strongly ammoniacal solution with oxygen addition ammounting to 150 Nl. oxygen per kg. dry substance.

The reaction which then occurs will terminate when the pH of the reaction solution drops to a value of about 7, namely when the added ammonia becomes bound by the lignin substance that has combined with the added oxygen, and in lesser measure by the resulting acids, e.g. carbonic acid. This makes it necessary to add ammonia to the reaction mixture in greater amount than would be necessary for fixation to the lignin product. For an economical procedure, which would also permit a recovery of the unused reaction components, it is necessary that the ammonia which is added at the beginning and during the reaction be measured on the basis of the desired nitrogen fixation and the amount of resulting carbonic acid in such a manner that at the end of the reaction there will be the smallest possible excess of ammonia with the pH of the reaction mixture down to about 7.5. The carbonic acid formation during the reaction shows likewise a practically linear relationship to the amounts of added oxygen, the variations of which will be limited by the homogeneity of the reaction.

For producing fertilizers from these products, it is convenient and advantageous to first add to the solution whatever other materials are necessary for the compounding of complete fertilizers, and then to evaporate the mixture down to dryness, with subsequent granulation. Acidic additions, as e.g. sulfuric acid, nitric acid, phosphoric acid, or acid salts, are suitable because they will combine with small amounts of free ammonia or ammonium carbonate or bicarbonate so as not to necessitate a recovery of surplus ammonia.

After the end of the reaction it is also possible by acidifying the solution to obtain most of the organic materials that have been formed therein, without the necessity of first concentrating the solution by evaporation. Preferably, the pH is brought down to a pH of 3 or less.

Most of the organic materials rich in nitrogen can also be obtained if the solution, after the end of the reaction, is heated to 150–350° C. to split off the sulfo-groups and condensates. Those products which are not very soluble will then separate.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

Into a 2 liter autoclave, 250 g. dry material from calcium bisulfite lye from cellulose digesters is introduced and 800 ml. 30% ammonia solution added to bring the volume up to 1 liter, so that about 1 liter of space remains for the oxidizing gas. After forcing in 80 liter oxygen the autoclave is heated to 122° C. and agitated to start the reaction. The progress of the reaction was followed by observing the lowering of the pressure.

After about 5 hours, the reaction was terminated, 75 liters oxygen having been used.

After cooling and depressurizing, the solution is carefully evaporated to dryness. The brownish black dry powder contained 21.04% total nitrogen and 14.38% ash. Of the total nitrogen 24.4% was ammonia nitrogen, 32.2% amide nitrogen, and the remainder (43.4%) firmly bound nitrogen.

*Example 2*

Into and through a continuously operating 80 liter reaction, 50 liter of solution pre-warmed to 130° C. and containing 200 g./l. of dried sulfite liquor and 250 g./l. ammonia is pumped. At the same time, oxygen under 15 atms. pressure is forced in. The mixture of solution and oxygen is pumped around to circulate and thoroughly mix the same. After a reaction time of 80 minutes, during which additional oxygen is pumped in to replace the consumed oxygen, the continuous introduction of the raw material and the continuous removal of the oxidized product was begun.

The solution after being cooled and brought to atmospheric pressure is then removed from the reactor, the remaining ammonia driven off, and the solution evaporated to dryness. An analysis of the residue gave the following results—23% total nitrogen and 13.9% ash. The nitrogen consisted of 34% ionic (ammoniacal) nitrogen, 13% amide nitrogen and 53% firmly bound organic nitrogen.

The invention is characterized by three essential factors, the variation of which makes it possible to obtain nitrogen-rich products in different ways. These three factors are the partial pressure of the oxygen, the amount of added ammonia and the temperature. It has unexpectedly been found that, in contrast to the previous processes, products with a high nitrogen content are obtained, due to the simultaneous action of oxygen and a high amount of ammonia in excess, related to the stoichiometrically required quantity. About fifty percent of the nitrogen contained in these products is bound in a form in which it quickly reacts, e.g. in the form of ionic nitrogen or amide nitrogen, whereas the other fifty percent of the nitrogen is bound in the same manner as in amino or cyclic compounds.

The unexpected progress in the working method has been such that, due to the high amount of ammonia in excess, the oxidation of the organic molecule of the sulphite liquor does not result in the formation of carbon dioxide, but that the reactive groups formed intermediately by the oxidation react immediately with the ammonia in excess forming the various types of nitrogen compounds, so that compounds with stepwise changed properties can be produced. This stepwise change of the properties can be still more intensified by applying different partial pressures of the oxygen or different temperatures. In this connection it is essential to continuously maintain a high amount of ammonia in excess. The reaction is then controlled by setting the partial pressure of the oxygen to a certain value.

The velocity of the reaction and consequently the type of the nitrogen compound to be produced is influenced by the temperature. Products of a high percentage of amide nitrogen and cyclically bound nitrogen can be obtained by maintaining an elevated temperature of, for example, 110–120° C. Those products, when being used as fertilizers in arable soil, react slowly.

Products of a higher percentage of ionic and amide nitrogen which react more rapidly in arable soil can be obtained by maintaining a lower reaction temperature of, say, 70–80° C. The degree of oxidation can be adjusted, as desired, by dosing the oxygen, and the nitrogen content in the compound is varied accordingly.

From the foregoing description, one skilled in the art can easily ascertain the essential characteristics of this invention, and without departing from the spirit and scope thereof, can make various changes and modification of the invention to adapt it to various usages and conditions. Consequently, such changes and modifications are properly, equitably, and intended to be, within the full range of equivalence of the following claims.

What is claimed is:

1. In a process for the production of nitrogen-rich organic products especially suitable for use as fertilizers, the step which comprises simultaneously reacting at a temperature of 50 to 130° C. and at a pressure of 10 to 130 atmospheres waste sulfite liquors from cellulose digestors with at least 15% by weight of ammonia, based on the dry weight of the said sulfite liquor, and a molecular oxygen-containing gas, the pH of the said reaction mixture being at least 7.5 and the molar ratio of ammonia to molecular oxygen being about 3:5.

2. The process of claim 1, wherein the oxygen content is at least 300 N liters per kg. of dry starting material.

3. The process of claim 1, further comprising the addition to the reaction medium of 1–6% by weight of a member from the group consisting of an alkali metal hydroxide and an alkaline earth hydroxide.

4. The process of claim 1, further comprising the steps of adjusting the temperature to about 130° C. near the end of the reaction, and adjusting the pH so that the reaction terminates at a pH of about 7.5.

5. The process of claim 1, further comprising the subsequent step of acidifying the resultant reaction product to a pH of less than about 3, thereby precipitating the greater portion of the reaction product.

6. The process of claim 5, wherein an acidifying agent is employed which is selected from the group consisting of sulfuric acid, nitric acid, phosphoric acid, and acid salts thereof.

7. The process of claim 1, further comprising the step of heating the resultant reaction product to 150–350° C. to precipitate most of the organic materials rich in nitrogen.

8. The process of claim 1, wherein the content of ammonia is 20–200% by weight of the dry starting material, and is present in a concentration of 10–25% by weight in solution.

9. The process of claim 1, further comprising the step of precipitating the nitrogen-rich organic products, and drying said products at 60–110° C.

References Cited

UNITED STATES PATENTS

| | | | |
|---|---|---|---|
| 838,108 | 12/1906 | Hammerschlag | 71—24 |
| 1,606,015 | 11/1926 | Blackwell | 71—23 |
| 2,093,047 | 9/1937 | Hudig et al. | 71—24 |
| 2,992,093 | 11/1961 | Burdick | 71—24 |
| 3,146,087 | 8/1964 | Formaini et al. | 71—23 |

FOREIGN PATENTS

| | | |
|---|---|---|
| 361,890 | 11/1931 | Great Britain. |
| 424,260 | 2/1935 | Great Britain. |

DONALL H. SYLVESTER, *Primary Examiner.*

A. SCIAMANNA, G. W. RUTHERFORD,
*Assistant Examiners.*